United States Patent [19]

Phelps et al.

[11] Patent Number: 4,977,113
[45] Date of Patent: Dec. 11, 1990

[54] PROCESS FOR PRODUCING SILICON ALUMINUM OXYNITRIDE BY CARBOTHERMIC REACTION

[75] Inventors: Frankie E. Phelps, Washington Township, Westmoreland County; Gerald W. Leech, Apollo, both of Pa.

[73] Assignee: Aluminum Company of America, Pittsburgh, Pa.

[21] Appl. No.: 351,660

[22] Filed: May 15, 1989

[51] Int. Cl.$^5$ .................. C01B 33/26; C04B 35/58
[52] U.S. Cl. .................................. 501/98; 423/327
[58] Field of Search .......................... 423/327; 501/98

[56] References Cited

U.S. PATENT DOCUMENTS

| | | | |
|---|---|---|---|
| 3,837,871 | 9/1974 | Weaver | 106/65 |
| 3,903,230 | 9/1975 | Kamigaito et al. | 264/122 |
| 3,960,581 | 6/1976 | Cutler | 106/65 |
| 3,991,148 | 11/1976 | Lumby et al. | 501/98 |
| 3,991,166 | 11/1976 | Jack et al. | 423/327 |
| 4,147,759 | 4/1979 | Demit | 423/327 |
| 4,172,108 | 10/1979 | Maeda | 264/65 |
| 4,243,621 | 1/1981 | Mori et al. | 501/98 |
| 4,360,506 | 11/1982 | Paris et al. | 423/327 |
| 4,438,051 | 3/1984 | Mitomo et al. | 501/98 |
| 4,499,193 | 2/1985 | Phelps et al. | 501/98 |
| 4,511,666 | 11/1985 | Phelps et al. | 501/98 |
| 4,618,592 | 10/1986 | Kuramoto et al. | 501/96 |
| 4,680,278 | 7/1987 | Inoue et al. | 501/98 |
| 4,731,236 | 3/1988 | Murakawa et al. | 501/98 |
| 4,812,298 | 3/1989 | Kohtoku et al. | 423/327 |

FOREIGN PATENT DOCUMENTS

| | | | |
|---|---|---|---|
| 18106 | 1/1984 | Japan | 423/327 |
| 260410 | 12/1985 | Japan | 423/327 |

OTHER PUBLICATIONS

Review–Sialons and Related Nitrogen Ceramics, Jack, K. H., Journal of Materials Science 11 (1976), 1135–1158.

Synthesis of Silicon Nitride Powder from Silica Reduction, Inoue, H., Communications of the American Ceramic Society, Dec. 1982, C-205.

Primary Examiner—Wayne A. Langel
Attorney, Agent, or Firm—David W. Pearce-Smith

[57] ABSTRACT

A process for producing an unsintered SiAlON material by carbothermic reaction without the use of contaminating transition metal oxides to increase the rate of reaction. The process includes providing small quantities of SiAlON crystals which seed the reaction. The phase of the SiAlON seed crystals will determine the phase of the SiAlON produced.

21 Claims, No Drawings

PROCESS FOR PRODUCING SILICON ALUMINUM OXYNITRIDE BY CARBOTHERMIC REACTION

TECHNICAL FIELD

This invention relates to a process for making silicon aluminum oxynitride material and, more particularly, relates to a process for producing an unsintered silicon aluminum oxynitride by carbothermic reaction without the need to use contaminating impurities to increase the rate of reaction.

BACKGROUND ART

Silicon aluminum oxynitride refractory materials, and more particularly materials in the $Si_3N_4$-AlN-$Al_2O_3$-$SiO_2$ system, are of ever-increasing interest for refractory applications. For ease of identification, compositions within this system are referred to as SiAlON, and a number of different phases of SiAlON have been produced and identified. For example, Jack et al U.S. Pat. No. 3,991,166 describes one phase and methods of making it, the phase having the general formula $Si_{6-z}Al_zO_zN_{8-z}$ where z is greater than zero and less than or equal to five. Various compositions within the bounds of the general formula taught by Jack et al may be produced, and each has a crystalline structure similar to beta-$Si_3N_4$ and is consequently identified as beta'-SiAlON ($\beta'$-SiAlON). $\beta'$-SiAlON can be defined as a solid solution of $Al_2O_3$ within a matrix of $Si_3N_4$. The compositional limits of reactants, referred to as effective reactants, to produce $\beta'$-SiAlON may be seen by referring to FIG. 2. The compositional amounts of $Si_3N_4$, AlN and $Al_2O_3$ for any $\beta'$-SiAlON formulation may be determined by referring to line AB which is a plot of the compositions of the aforesaid compounds to produce a $\beta'$-SiAlON having the general formula $Si_{6-z}Al_zO_zN_{8-z}$ where z is greater than zero and less than or equal to five.

Another phase, known as y-phase SiAlON represented by the formula $SiAl_4O_2N_4$, is described in an article entitled "Review: SiAlONs and Related Nitrogen Ceramics", published in *Journal of Material Sciences*, 11 (1976) at pages 1135–1158. Compositions of SiAlON within a given phase and from phase to phase demonstrate varying characteristics, for example, variances in density, which effect their preferential use in a given application.

A number of processes for making silicon aluminum oxynitride refractories and technical ceramics have been suggested. Weaver U.S. Pat. No. 3,837,871 describes a method for producing a product having a substantial amount of what the patentee believes to be the quaternary compound silicon aluminum oxynitride which has a structure similar to that of beta $Si_3N_4$ but with an expanded lattice structure. Weaver's method of making the described product is hot pressing $Si_2ON_2$ (silicon oxynitride) in the presence of varying amounts of aluminum.

Kamigaito et al U.S. Pat. No. 3,903,230 describes a method of making a silicon aluminum oxynitride ceramic by sintering or hot pressing a mixture of finely divided powders of silicon nitride, alumina and aluminum nitride.

Cutler U.S. Pat. No. 3,960,581 describes a process for producing SiAlON by reacting silicon and aluminum compounds in the presence of carbon and nitrogen. Cutler teaches and stresses the importance of using a reactant material having the silicon and aluminum compounds intimately combined prior to nitriding in order that aluminum oxide is intimately dispersed throughout silicon nitride in the final product. Suggested reactant materials are clay, rice hulls having a solution containing a dissolved aluminum salt absorbed therein, and a precipitate of aluminum and silicon salts. In each case Cutler emphasizes that the silicon and aluminum compound reactants are intimately combined prior to nitriding to produce SiAlON. Further, in the process as taught by Cutler, excess carbon and unreacted silicon dioxide must be removed from the mixture after the mixture is nitrided.

Maeda U.S. Pat. No. 4,172,108 describes a process for production of SiAlONs which involves heating a mixture containing a silicon nitride precursor having at least one silicon-nitrogen bond and an alumina precursor having at least one aluminum-oxygen bond to at least 1000° C.

Inoue U.S. Pat. No. 4,680,278 describes a process for preparing aluminum nitride powder having small particle size and small particle size distribution and also having a uniform shape of particles, at a lower temperature and in a shorter period of time. Inoue teaches that the aluminum nitride powder can be mixed in predetermined amounts with silicon carbide and silicon nitride to form SiAlON.

Thus far, of all the SiAlON materials, the $\beta'$-SiAlONs have generated the greatest interest because their refractory properties and corrosion resistance characteristics are comparable to other nitride refractories such as silicon nitride and silicon oxynitride. More recently, the $\beta'$-SiAlONs have generated a great deal of interest as technical ceramics, i.e. monolithic engineered ceramics.

$\beta'$-SiAlON compositions offer a distinct advantage over silicon nitride and silicon oxynitride for making a refractory because some of the compositions of $\beta'$-SiAlON material can be used to produce a high density refractory by conventional sintering techniques. To produce high density ceramics from silicon nitride or silicon oxynitride requires the use of pressure sintering techniques.

Jack et al U.S. Pat. No. 3,991,166 describes a $\beta'$-SiAlON product produced by sintering a mixture of alumina or a compound which decomposes to produce alumina and silicon nitride. Another method of producing $\beta'$-SiAlON as described by Jack et al is nitriding silicon powder in the presence of alumina powder.

Demit U.S. Pat. No. 4,147,759 describes a method of manufacturing $\beta'$-SiAlON compounds. The method involves reacting silicon nitride and aluminum oxynitride in the presence of an agent which generates gaseous silicon monoxide.

It may be noted that several of the foregoing processes employ silicon nitride or silicon oxynitride as reactants. Neither of these compounds is found in nature and they are relatively expensive to produce. The production of SiAlON from discrete particles of an $SiO_2$ source and discrete particles of an $Al_2O$ source is a very time consuming process, and therefore very expensive, because of the slow rate of the initial reaction and the subsequent nitriding reaction Phelps et al U.S. Pat. No. 4,499,193 describes a process for carbothermically producing an unsintered refractory material comprising essentially $\beta'$-SiAlON wherein the initial reactants include discrete particles of an SiO₂ source and discrete particles of an Al₂O₃ source. Phelps discloses that it is advantageous to add iron in the form such as Fe₂O₃ as a catalyst in promoting the formation of β'-SiAlON.

Phelps et al U.S. Pat. No. 4,511,666 describes a process for carbothermically producing an unsintered refractory material comprising essentially β'-SiAlON wherein initial reactants include discrete particles of an SiO₂ source, discrete particles of an Al₂O₃ source and discrete particles of silico alumina compounds. The initial reactants are nitrided for sufficient times and temperatures to convert at least a portion of the initial reactants to at least a portion of effective reactants, and the effective reactants are then further heated to produce an essentially β'-SiAlON refractory material Phelps discloses that it is advantageous to add iron in the form such as Fe₂O₃ as a catalyst in increasing the rate of reaction and promoting the formation of β'-SiAlON. Phelps also discloses that oxides of other transitional metals such as nickel, chrome or manganese, for example, may also be used as catalysts.

Generally, only a small percentage of catalyst, such as 2% or less Fe₂O₃, for example, is added to increase the rate of carbothermic reaction and reduce the length of time needed to form SiAlON. However, when Fe₂O₃ is used as a catalyst, the iron reacts with silica to produce an FeSi phase which is present as a contaminant in the final sintered product. FeSi forms flaw sites in the SiAlON which initiate fractures and lowers its room temperature strength. Furthermore, when the SiAlON is used in high temperature (1200°–1300° C.) applications, the FeSi oxidizes and further reduces the materials strength.

It would be advantageous, therefore, to provide a process whereby readily available and relatively inexpensive initial reactant materials comprising Al₂O₃ and SiO₂ are nitrided to make silicon aluminum oxynitride materials without the necessity of the introduction of contaminating impurities to increase the reaction rate and promote the formation of SiAlON.

The principal object of the present invention is to provide a low-cost process for producing SiAlON from initial reactant materials comprising Al₂O₃, SiO₂ and carbon.

Another object of the present invention is to provide a low-cost process for producing SiAlON from initial reactant materials comprising Al₂O₃, SiO₂ and carbon that does not require the addition of transition metals such as iron, nickel, chrome or manganese, to be used as catalysts to increase the rate of reaction.

A further object of the present invention is to provide a process for producing unsintered β'-SiALON powder by carbothermic reaction.

Another object of the present invention is to provide a low-cost process for producing unsintered high purity alpha silicon nitride structured SiAlON by carbothermic reaction from initial reactant materials comprising Al₂O₃, SiO₂ and carbon.

These and other objects and advantages will be more fully understood and appreciated with reference to the following description.

SUMMARY OF THE INVENTION

A process for producing an essentially SiAlON material The process comprises the steps of (1) providing a mixture of initial reactant materials as sources of SiO₂, Al₂O₃ and C in a reactor; (2) adding SiAlON crystals into said mixture; (3) nitriding said mixture at temperatures between 1200° C. and 1450° C. for a time sufficient to convert at least a portion of said initial reactants to at least a portion of effective reactants; and (4) heating said effective reactants in the presence of nitrogen at temperatures from 1400° to 1650° C. for a time sufficient to convert said effective reactants to an essentially SiAlON refractory material.

Surprisingly, the form of SiAlON crystals added to the mixture will determine the structure of the resulting SiAlON. Thus, if alpha-SiAlON (α-SiALON) crystals are used to seed the reaction, the structure of the resulting SiAlON is of the alpha phase. If y-phase SiAlON crystals are used to seed the reaction, the structure of the resulting SiAlON is of the y-phase. Similarly, it has also been found that if β' phase SiAlON crystals are used to seed the reaction, the structure of the resulting SiAlON is of the β' phase.

DESCRIPTION OF A PREFERRED EMBODIMENT

As has been noted previously, β'-SiAlON may be defined as a solid solution of Al₂O₃ within an Si₃N₄ matrix and is represented by the general formula $Si_{6-z}Al_zO_zN_{8-z}$ where z is greater than zero and less than or equal to five. The carbothermic formation of β'-SiAlON by the process of the present invention can be represented by the following equation:

$$Al_2O_3 + SiO_2 + C \xrightarrow{N_2(g) + \beta'\text{-SiAlON}} \beta'\text{-SiALON} + CO \quad (a)$$

To produce β'-SiAlON by a process of this invention, initial reactants Al₂O₃, SiO₂ and C are provided in composition ratios. To produce a β'-SiAlON when z=2 with a formula of Si₂AlON₃, for example, would require 23% by weight Al₂O₃, 24% by weight C and 53% by weight SiO₂.

The SiO₂, Al₂O₃ and C initial reactants, together with one micron β'-SiAlON crystals, are mechanically mixed by any suitable mixing method to uniformly blend the particles, if necessary. The particles are then combined with enough liquid vehicle, such as water, by mixing either during blending or subsequent thereto, preferably subsequent thereto, to render the mixture plastic for extruding or other molding methods familiar to one skilled in the art to produce a pellet suitable for nitriding. The particle size of the reactants may vary, but generally, the smaller the particle size, the more complete the reaction when fired, as will be discussed later. The preferred median particle size of Al₂O₃ is less than 3.5 microns and more preferably less than 1 micron. The preferred SiO₂ source is fumed silica having a median particle size of 0.1 micron, however the silica source may have a particle size which is as large as about 25 microns.

After mixing and molding the initial reactants into pellets, the pellets are dried at a low temperature, such as 110° C., for example, to drive off any excess moisture. The pellets are then charged into a reaction chamber adapted to nitride and heat the pellets in a two-stage heating cycle. Nitrogen may be provided as a gas or a compound, such as ammonia, for example, that will reduce to nitrogen gas at the reaction temperature. It is preferred that the nitrogen be provided continuously under a positive pressure to insure that the nitrogen will uniformly contact all of the reactants during the reaction cycle. A suitable reactor to accomplish the above purposes is a fluid bed reactor or packed bed reactor provided with a nitrogen gas dispersing means near the bottom of the reactor and a nitrogen and off-gas outlet near the top. After charging a first charge of pellets into the reactor into an upper heat zone to form a suitable bed, nitrogen is dispersed through the bed under a positive pressure to purge the reactor of its normal atmosphere.

After establishing a nitrogen atmosphere within the reactor, temperature of the reactants is elevated by a suitable heating means to a temperature of at least 1200° C., preferably at least 1400° C., in the upper heating zone of the reactor. It is believed that by maintaining the reactants at a given temperature of at least 200° C. for a sufficient period of time, a portion of the initial reactants are reduced to a portion of the effective reactants necessary for producing an unsintered $\beta'$-SiAlON. The period of time required to accomplish this initial reaction will vary with the temperature employed. It has been discovered that although no catalyst has been added to the initial mixture heating the mixture at a temperature of 1400° C. for 1-3 hours, for example, is sufficient to accomplish the initial reaction in the process when it is seeded with $\beta'$-SiAlON. When seeding the reaction with $\alpha$-SiALON it is preferred to elevate the temperature for 1-5 hours. It has also been discovered that when the reactant temperatures exceed 1450° C., the nitridation of silica will cease and silicon carbide will form as the preferred species. In addition, $Al_2O_3$ and carbon have been found to react at an appreciable rate when the reactant temperatures exceed 1450° C. to 1480° C. Therefore, if the nitrification is not completed before beginning the second higher temperature heating, silicon carbide will be present in the product.

It is believed that the above-described initial nitriding step yields $Si_3N_4$, traces of AlN which are not normally detectable by x-ray diffraction procedures and CO as off-gas. The reactions may be represented by the equations:

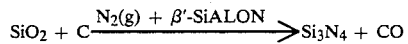  (b)

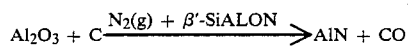  (c)

It may be noted that in addition to $Si_3N_4$ and AlN, $Al_2O_3$ is also required as an effective reactant in producing $\beta'$-SiAlON, and $Al_2O_3$ is provided in a quantity in excess of the amount needed for production of the necessary AlN so that a portion of the $Al_2O_3$ remains as an effective reactant after the initial reaction. It is also to be noted that some conversion of the effective reactants begins to occur during the first heating step at temperatures as low as 1200° C.

Following the above-described initial nitriding step, the first charge of pellets is moved to a second heat zone and the reactant temperature is increased to a maximum of 1650° C., preferably within a range of 1450° to 1600° C., and maintained within that temperature range for a time sufficient to convert the effective reactants to $\beta'$-SiAlON. Concurrently with the movement of the first charge of pellets into the second heat zone, additional initial reactants are charged into the first heat zone. As previously stated, it is believed that some conversion of the effective reactants begins to occur at temperatures as low as 1200° C., but it has been discovered that if the temperature is increased, less time is required to effect an essentially complete conversion of the effective reactants to $\beta'$-SiAlON. Within a range of 1450° to 1600° C., a heating time of 2 hours is sufficient to yield an essentially single phase $\beta'$-SiAlON. Thus, the time of residence of the reactants in each heat zone can be controlled to be essentially the same and the process can be operated on a continuous or batch-by-batch basis.

In an alternate method of operating the process continuously, the initial reactants may be fed into the first heat zone at a rate suitable to traverse the first heat zone and effect the conversion to effective reactants. The effective reactants then move continuously into the second heat zone and traverse the second zone in a sufficient length of time to allow the reactants to convert to an essentially $\beta'$-SiAlON material. It may be seen that the extent of the heat zones may be adjusted to insure that the pellets remain in each heat zone a sufficient length of time as they advance at a uniform rate. Although raising the temperature in the final nitriding step is advantageous in effecting a conversion of the transitional or effective reactants into an essentially single phase $\beta'$-SiAlON, raising the temperature above approximately 1650° C. promotes the formation of other SiAlON phases which may be detrimental to the purposes of the end product formed by the method of the invention.

During the final heating step after nitriding, a nitrogen atmosphere is maintained in the reactor to preserve a stoichiometric balance as expressed in the equation:

  (d)

Once again, it is to be noted that some conversion of the effective reactants begins to occur during the first heating step at temperatures as low as 1200° C., but if the temperature is increased, less time is required to effect an essentially complete conversion of the effective reactants to $\beta'$-SiAlON. One skilled in the art will appreciate that equations (a), (b) and (c) above are taking place simultaneously (although not at the same rates) and are theoretical tools for understanding the carbothermic reaction of equation (a).

In the foregoing description, the two-step nitriding and heating cycle of the reactants is accomplished successively. The reactions may be represented by the equations:

  (e)

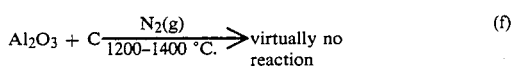  (f)

  (g)

Surprisingly, it has been found that if $\alpha$-SiAlON crystals are used in place of the $\beta'$-SiAlON crystals, the structure of the resulting SiAlON is of the alpha phase ($\alpha$-SiAlON). The formation of alpha phase SiAlON may be represented by the equations:

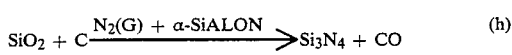  (h)

  (i)

and

-continued $$Si_3N_4 + Al_2O_3 + AlN \longrightarrow \alpha\text{-SiAlON} \quad (j)$$

By alpha SiAlON we mean alpha $Si_3N_4$ structured SiAlON. Heretofore, the carbothermic reaction approach has always produced $\beta'$-SiAlON. The alpha phase of the SiAlON is not normally produced by carbothermic reaction of discrete particles of an $SiO_2$ source and discrete particles of an $Al_2O_3$ source. It has also been found that if y-phase SiAlON crystals are used in place of the $\beta'$-SiAlON crystals, the structure of the resulting SiAlON is of the y-phase.

The following examples are offered to illustrate the production of unsintered SiAlON by the process of this invention.

EXAMPLE 1

$\beta'$-SiAlON with z=0.5 was prepared from a mixture of 156 grams $Al_2O_3$ (5.2%), 2019 grams silica (67.4%) and 825 grams carbon(27.5%). This mixture was blended with 450.0 grams of 1 micron $\beta'$-SiAlON seed crystals(15 wt. % addition to the mixture on a dry basis). The final blend had a final composition of 4.51 wt. % $Al_2O_3$, 58.53 wt. % $SiO_2$, 23.91 wt. % carbon and 13.04 wt. % $\beta'$-SiAlON seed. The stoichiometric reaction may be represented by the following equation:

$$Al_2O_3 + 22\, SiO_2 + 45\, C \xrightarrow{15\, N_2(g) + \beta'\text{-SiALON}} 2\,\beta'\text{-SiALON} + 45\, CO \quad (k)$$

The blend was charged into a 1.3 gal ceramic ball mill where the materials were uniformly mixed. The resultant powder was blended with $H_2O$ and extruded. The extrudate was dried at 110° C. to drive off the water and was charged into an enclosed reactor vessel provided with an inlet below the pellet bed to permit uniform circulation of gaseous nitrogen through the pellets and an outlet near the top of the vessel to permit discharge of nitrogen and reaction gas products.

The vessel having the pellets therein was enclosed in a heating chamber and nitrogen was charged into the vessel at a pressure sufficient to maintain a flow of nitrogen through the vessel throughout the subsequent heating cycles.

When it was determined that the reaction vessel had been purged of air, temperature within the heating chamber was increased an amount necessary to raise the temperature of the pellets to 1400° C. and that pellet temperature was maintained for 3 hours.

The pellet temperature was then increased to 1600° C. and maintained there for 2 hours. The pellets were then cooled to room temperature and analyzed for composition. It was determined by x-ray diffraction that the processed material comprised: $\beta'$-SiAlON as a major phase, possible trace of SiC and possible trace Fe. Chemical analysis was as follows: 51.7 wt. % Si; 5.52 wt. % Al; O (NA); N (NA); and 0.2 wt. % Fe impurities. Note iron levels of 1-2% are typical when $Fe_2O_3$ has been added as a catalyst. The material was sintered into eleven military type "B" bars and tested in accordance with Military Standard 1942. The strength of the bars was tested at room temperature and average strength was found to be 77.3 ksi with a range of strengths from 71.4 to 87.5 ksi.

In addition, the material was sintered into bars having the following dimensions: 1.875 inches×0.25 inches ×0.125 inches. The strength of the bars was tested by 4 point bending at room temperature, 1093° C., 1204° C. and 1204° C. The strengths are recorded on Table 1 below.

TABLE 1

| Temp.°C. | Strength (ksi) | |
|---|---|---|
| | Average | Range |
| 25 | 57.6 | 46.4–65.7 |
| 1093 | 50.4 | 49.2–53.3 |
| 1204 | 39.2 | 35.1–44.1 |
| 1260 | 28.8 | 25.1–33.7 |

EXAMPLE 2

Example 1 was repeated except that no SiAlON crystals were added to the mixture before firing. In addition, no iron catalyst was added. It was determined by x-ray diffraction that the processed material was comprised of $\beta'$-SiAlON as a major phase, $Si_2ON_2$ as a major phase and SiC as a minor phase. Chemical analysis was as follows: 50.9 wt. % Si; 5.45 wt. % Al and 0.1 wt. % Fe impurities.

The x-ray results of Example 2 reveal that the nitriding reaction was not completed at 1400° C. as evidenced by the oxynitride and relative large quantity of silicon carbide.

Example 1 was repeated except that alpha SiAlON crystals instead of $\beta'$-SiAlON crystals were added to the mixture before firing. In addition, no iron catalyst was added. It was determined by x-ray diffraction that the processed material comprised: $\alpha$-SiAlON as a major phase, possible trace of SiC and possible trace Fe. The material was sintered into military type "B" bars and tested in accordance with Military Standard 1942. The strength of the bars was tested at room temperature and average strength was found to be 79.5 ksi with a range of strengths from 72.3 to 90.5 ksi.

It is contemplated that different forms of $SiO_2$ and $Al_2O_3$ may be used in practicing the process of the present invention. Thus for example, some forms of $SiO_2$ which can be used as the initial reactant are quartz, cristabolite, tridymite and amorphous silica. Some suitable forms of $Al_2O_3$ which can be used as the initial reactant are $\alpha$-$Al_2O_3$, $\beta$-$Al_2O_3$, K-$Al_2O_3$ and other phases of $Al_2O_3$, oxides and hydroxides of aluminum, aluminum carbonate, aluminum nitrate and gibbsite. One skilled in the art will appreciate that the choice of $SiO_2$ and $Al_2O_3$ which is actually used will be made on cost considerations and that many other forms of $SiO_2$ and $Al_2O_3$ than those specifically listed can be used. In a preferred form of the present invention the preferred median particle size of the $Al_2O_3$ initial reactant is less than 3.5 microns.

In addition, the material was sintered into bars having the following dimensions: 1.875 inches×0.25 inches×0.125 inches. The strength of the bars was tested by 4 point bending at room temperature, 1093° C., 1204° C. and 1204° C. The strengths are recorded on Table 2 below.

TABLE 2

| Temp.°C. | Strength (ksi) | |
|---|---|---|
| | Average | Range |
| 25 | 68.1 | 59.6–72.6 |
| 1093 | 61.3 | 51.3–68.5 |
| 1204 | 65.4 | 61.1–72.9 |

TABLE 2-continued

| Temp.°C. | Strength (ksi) | |
| --- | --- | --- |
| | Average | Range |
| 1260 | 59.8 | 53.3–64.8 |

It is also contemplated that different weight percents of seed material may be used in practicing the present invention. Thus for example, other than 15 wt. % of on a dry basis seed material may be used. A preferred range for the weight percent of seed material is 4 to 25%. One skilled in the art will appreciate that the higher the weight percent of seed material that is actually used the faster will be the rate of reaction. Although weight percents as high as 50% may be used, the upper limit of the actual percent of seed material is not critical to practicing the invention. The real upper limit to the percentage of seed material which is actually used will be determined by cost considerations. At the lower limit of seed material used in practicing the present invention, the rate of reaction will be greatly reduced when the percentage of material is below 1%.

It is further contemplated that the SiAlON material can also be made using $Si_3N_4$ as the seed material. Once SiAlON is made in accordance with the present invention, part of the SiAlON material produced can be used as seed material of future SiAlON material. Thus, after the initial SiAlON has been produced there is no need to purchase additional SiAlON or $Si_3N_4$ for use as seeding material.

It is further contemplated that the unsintered SiAlON material made in accordance with the present invention can be readily ground to any desired degree of fineness to make a highly reactive grain or powder for subsequent processing. The unsintered SiAlON powder can then be molded into a desired shape and sintered to produce a high density, high strength part such as a component of an internal combustion engine or a high temperature gas turbine. In another application, the unsintered SiAlON powder might be combined with a suitable carrier, applied as a layer to a substrate and affixed thereto by heating to a temperature sufficient to fuse or bond the SiAlON to the substrate. Those skilled in the art will recognize that the particulate SiAlON of the present invention is easier to grind or mill to a desired grain or powder than sintered SiAlON. To the extent that sintered SiAlON could be ground, the resultant powder would not be desirable for use in resintering to make a shape or part. It would have a limited sintering capability, and to the extent it could be resintered, the resintered product would be substantially inferior to a product made from the unsintered SiAlON material of the present invention.

While the invention has been described in terms of preferred embodiments, it is intended that all matter contained in the above description or shown in the accompanying drawings shall be interpreted as being illustrative. The present invention is indicated by the broad general meaning of the terms in which the appended claims are expressed.

What is claimed is:

1. A method of carbothermically producing SiAlON which is substantially free of transition metal oxide catalyst contaminants, said method including a nitriding step, the method comprising the step of adding crystals selected from the group of SiAlON and $Si_3N_4$ to sources of $SiO_2$, $Al_2O_3$, and carbon prior to nitriding.

2. The method according to claim 1 wherein said SiAlON crystals are selected from the group of $\beta'$-SiAlON, $\alpha$-SiAlON and y-phase SiAlON and said SiAlON produced is $\beta'$SiAlON, $\alpha$-SiAlON and, y-phase SiAlON, respectively.

3. A process for producing a SiAlON material, the process comprising:
   forming a blend by adding crystals selected from the group of SiAlON and $Si_3N_4$ to sources of $SiO_2$ $Al_2O_3$ and carbon prior to nitriding;
   nitriding said blend at temperatures of up to approximately 1450° C. to convert at least a portion of said blend to a mixture containing $Si_3N_4$ and AlN; and
   heating said mixture to a temperature above said nitriding temperature in the presence of nitrogen to convert said mixture to a SiAlON material 4. A process according to claim 3 wherein said SiAlON crystals are selected from the group of $\beta'$-SiAlON, $\alpha$-SiAlON and y-phase SiAlON and said SiAlON produced is $\beta'$-SiAlON, $\alpha$-SiAlON and, y-phase SiAlON, respectively.

5. A process according to claim 4 wherein said SiAlON crystals are $\alpha$-SiAlON and said step of nitriding said mixture is performed at temperatures between 1200° C. and 1450° C. for less than 5 hours.

6. A process according to claim 2 wherein said SiAlON crystals are $\beta'$-SiAlON and said step of nitriding said mixture at temperatures between 1200° C. and 1450° C. is performed for less than 3 hours.

7. A process according to claim 3 wherein the median particle size of said crystals is less than or equal to approximately 1 micron.

8. The process according to claim 3 wherein said nitriding step includes heating in the presence of nitrogen is at temperatures from 1200° to 1450° C.

9. The process according to claim 3 wherein said heating step includes heating in the presence of nitrogen at temperatures from 1450° to 1600° C.

10. The process according to claim 3 wherein said source of $Al_2O_3$ is selected from a group of materials consisting of aluminum carbonate, aluminum nitrate, oxides and hydroxides of aluminum and gibbsite.

11. A process according to claim 3 wherein the median particle size of said source of $Al_2O_3$ is less than 3.5 microns.

12. The process according to claim 3 wherein said source of $SiO_2$ is selected from a group of materials consisting of quartz, cristabolite, tridymite and amorphous silica.

13. A process according to claim 3 wherein said process further includes the step of:
    compacting said SiAlON material to produce a sintered SiAlON product.

14. A process according to claim 3 wherein said nitriding includes providing nitrogen gas under a pressure sufficient to maintain a flow of nitrogen through the reactor.

15. A process according to claim 3 whereby SiAlON is produced continuously by providing the initial reactants to a reactor for nitriding and heating at a rate commensurate with the rate of discharge of said SiAlON from the reactor.

16. A process according to claim 3 wherein said mixture contains less than approximately 20% weight addition of SiAlON crystal.

17. A process according to claim 3 wherein said step of mixing includes mixing less than approximately 13% weight addition of SiAlON crystal.

18. A process for producing a SiAlon material, the process comprising:

forming a mixture by adding crystals selected from the group of SiAlON and $Si_3N_4$ to sources of $SiO_2$, $Al_2O_3$ and carbon prior to nitriding;

nitriding said mixture at temperatures of up to approximately 1450° C. to convert at least a portion of said mixture to $Si_3N_4$, AlN and $Al_2O_3$; and without compacting, heating said mixture of $Si_3N_4$, AlN and $Al_2O_3$ to a temperature above said nitriding temperature to convert said mixture to a SiAlON material.

19. A process according to claim 18 wherein said SiAlON crystals are selected from the group of $\beta'$-SiAlON, $\alpha$-SiAlON and y-phase SiAlON and said SiAlON produced is $\beta'$-SiAlON, $\alpha$-SiAlON and, y-phase SiAlON, respectively.

20. A process according to claim 18 wherein said SiAlON crystals are $\alpha$SiAlON and said step of nitriding said mixture is performed at temperatures between 1200° C. and 1450° C. for less than 5 hours.

21. A process according to claim 18 wherein said SiAlON crystals are $\beta'$-SiAlON and said step of nitriding said mixture is performed at temperatures between 1400° C. and 1600° C. for less than 3 hours.

* * * * *

UNITED STATES PATENT AND TRADEMARK OFFICE
CERTIFICATE OF CORRECTION

PATENT NO. : 4,977,113
DATED : December 11, 1990
INVENTOR(S) : Frankie E. Phelps, Gerald W. Leech and Robert W. Woods It is certified that error appears in the above—identified patent and that said Letters Patent is hereby corrected as shown below:

On the title page:
[75] Inventors: line 3	After "Apollo", delete "both of Pa." and insert --Robert W. Woods, New Kensington, all of Pa.--.

Col. 4, line 34	Change "composition" to --compositional--.

Col. 5, line 13	Change "200°C" to --1200°C--.

Col. 8, line 28	Insert heading --Example 3--.

Signed and Sealed this

Fifth Day of January, 1993

Attest:

DOUGLAS B. COMER

*Attesting Officer*	*Acting Commissioner of Patents and Trademarks*